(12) United States Patent
Nakano

(10) Patent No.: US 7,697,482 B2
(45) Date of Patent: Apr. 13, 2010

(54) LOAD REDISTRIBUTION METHOD AND SYSTEM FOR REDUCING INTERFERENCE IN A WIRELESS NETWORK

(75) Inventor: Yoshihisa Nakano, Saitama (JP)

(73) Assignee: OKI Electric Industry Co., Ltd., Tokyo (JP)

( * ) Notice: Subject to any disclaimer, the term of this patent is extended or adjusted under 35 U.S.C. 154(b) by 1027 days.

(21) Appl. No.: 11/408,055

(22) Filed: Apr. 21, 2006

(65) Prior Publication Data

US 2006/0239230 A1   Oct. 26, 2006

(30) Foreign Application Priority Data

Apr. 22, 2005   (JP) ............................. 2005-125359

(51) Int. Cl.
*H04W 4/00* (2009.01)
(52) U.S. Cl. .................. 370/331; 455/439; 455/453
(58) Field of Classification Search ......... 455/436–444, 455/450–453; 370/331–334
See application file for complete search history.

(56) References Cited

U.S. PATENT DOCUMENTS

| | | | |
|---|---|---|---|
| 5,794,149 A * | 8/1998 | Hoo | 455/438 |
| 6,701,150 B1 * | 3/2004 | Huang et al. | 455/439 |
| 6,947,768 B2 * | 9/2005 | Adachi et al. | 455/560 |
| 7,353,028 B2 * | 4/2008 | Fukuhara | 455/436 |

FOREIGN PATENT DOCUMENTS

JP   2003-249935   9/2003

* cited by examiner

*Primary Examiner*—Lester Kincaid
*Assistant Examiner*—Steven Lim
(74) *Attorney, Agent, or Firm*—Rabin & Berdo, P.C.

(57) ABSTRACT

A wireless network in which wireless terminals associate with particular access points maintains information about the positions and associations of the terminals and calculates loads on access points. To provide increased bandwidth at a heavily loaded access point, terminals associated with adjacent access points are handed over to more distant access points, so that the adjacent access points become less active and generate less interference. The hand-over is initiated and carried out by the access points concerned, rather than by the terminal that is handed off. Loads can accordingly be balanced promptly and interference can be reduced.

7 Claims, 14 Drawing Sheets

LOAD REDISTRIBUTION METHOD AND SYSTEM FOR REDUCING INTERFERENCE IN A WIRELESS NETWORK

BACKGROUND OF THE INVENTION

1. Field of the Invention

The present invention relates to a wireless communication network, and in particular to a method and system for redistributing loads among the access points of a wireless communication network so as to reduce interference.

2. Description of the Related Art

The terminals of a wireless communication network generally receive control signals such as beacon signals from access points, select the strongest signal, and associate with the access point from which that signal was received. Technology of this type for connecting access points with wireless terminals is disclosed in, for example, Japanese Patent Application Publication No. 2003-249935. In the disclosed technology, communication takes place on a plurality of channels, using a carrier sensing function. A wireless terminal measures the electric field strength of the signal received from its associated access point. If the received electric field strength falls below a threshold value, the terminal may re-associate with a different access point.

In wireless networks using the above technology, an access point cannot choose the wireless terminals that will associate with it; it is the wireless terminal that decides which access point to associate with, mainly on the basis of received signal strength. This terminal-centered association strategy does not necessarily produce a well-balanced pattern of associations in the network as a whole, and can lead to unnecessary interference between wireless signals. This problem cannot be avoided by the prior art.

Interference reduces the amount of communication the network can carry, referred to as the bandwidth of the network. An example will be described with reference to FIG. 1.

The wireless network 1 in FIG. 1 is a so-called extended service set (ESS) network comprising a backbone network 3 with five access points (APs) 10-1 to 10-5 mutually interconnected by, for example, wired communication lines. Four mobile stations or wireless terminals 2-1 to 2-4 are currently present in the network area.

The fan-shaped sector depicted under each access point indicates its signal range, in which communication with wireless terminals can take place. In the areas of sector overlap, a wireless terminal can communicate with either of two adjacent access points. All wireless communications are assumed to take place on a single common channel, which simplifies the wireless connection procedure when the wireless terminals move from one access point to another. Each of access points 10-1 to 10-5 is out of the range of the adjacent access points; the access points do not communicate with each other on the common wireless channel.

In FIG. 1, two wireless terminals 2-1, 2-2 are within communication range of access point 10-2. Wireless terminal 2-1 is currently associated with access point 10-2, as indicated by the solid arrows, and is communicating with access point 10-2. Access point 10-2 and wireless terminal 2-1 form a so-called basic service set (BSS) network.

Similarly, two wireless terminals 2-2, 2-3 are within communication range of access point 10-3. Both wireless terminals 2-2, 2-3 are currently associated with access point 10-3, forming another BSS network.

Similarly, two wireless terminals 2-3, 2-4 are within communication range of access point 10-4. Wireless terminal 2-4 is currently associated with access point 10-4, forming yet another BSS network.

Under these conditions, interference may occur at access point 10-2. Access point 10-2 is communicating only with wireless terminal 2-1, but wireless terminal 2-2 is also within its signal range. If wireless terminal 2-2 begins communicating with access point 10-3, then as indicated by the dotted arrow, the signals transmitted by wireless terminal 2-2 will also be received by access point 10-2, where they may collide with signals transmitted by wireless terminal 2-1. Access point 10-2 will then be unable to receive information from wireless terminal 2-1 correctly, and will fail to transmit a reply to wireless terminal 2-1, forcing wireless terminal 2-1 to retransmit the same information. In other words, the bandwidth of the link between access point 10-2 and wireless terminal 2-1 will be reduced by an amount corresponding to the amount of traffic between wireless terminal 2-2 and access point 10-3.

For similar reasons, access point 10-4 and wireless terminal 2-4 may also find their bandwidth reduced.

Bandwidth may also be reduced on the links between access point 10-3 and wireless terminals 2-2 and 2-3.

Although no signal collisions occur at access point 10-3, which communicates with wireless terminals 2-2 and 2-3 in different time slots, signals sent from access point 10-3 to wireless terminal 2-2 may collide with signals sent from the adjacent access point 10-2 to wireless terminal 2-1, which are also received at wireless terminal 2-2. Wireless terminal 2-2 will then be unable to receive information from access point 10-3 correctly, and access point 10-3 may have to retransmit the same information to wireless terminal 2-2.

Similarly, signals transmitted from access point 10-3 to wireless terminal 2-3 may collide with interfering signals transmitted by access point 10-4, intended for wireless terminal 2-4.

In other words, the bandwidth of the links between access point 10-3 and its associated wireless terminals 2-2, 2-3 will be reduced whenever the adjacent access points 10-2, 10-4 communicate with wireless terminals 2-1 and 2-4. In the network as a whole, on the average, bandwidth is reduced in proportion to the amount of overlap between signal ranges.

SUMMARY OF THE INVENTION

An object of the present invention is to redistribute the communication load in a wireless network so as to reduce interference due to overlap between adjacent signal ranges.

The invention provides a method and system for redistributing loads among a plurality of wireless access points that provide wireless access from a plurality of terminals to a network of the type in which each terminal associates and communicates with a selected access point. Information about positions and associations of the terminals is maintained, and a load on a first access point, such as the amount of communication traffic carried by the access point or the amount of traffic generated by a terminal associated with the first access point, is calculated. When the calculated load satisfies a predetermined condition, e.g., when the load reaches a predetermined value, the system selects a first terminal associated with the first access point, finds a second access point within communication range of the first terminal, finds a second terminal associated with the second access point, and finds a third access point within communication range of the second terminal. The second terminal is then handed over from the second access point to the third access point by associating the second terminal with the third access point and de-associating the second terminal from the second access point.

The invention also provides an access point with processing means for implementing the invented system and method, and provides a wireless network comprising a plurality of such access points.

The invention balances network loads by handing terminals associated with access points adjacent to a heavily loaded access point over to access points more distant from the heavily loaded access point. As a result, the access points adjacent to the heavily loaded access point become less active and generate less interference, thereby increasing the bandwidth available to the heavily loaded access point.

DETAILED DESCRIPTION OF THE INVENTION

Figure 1:
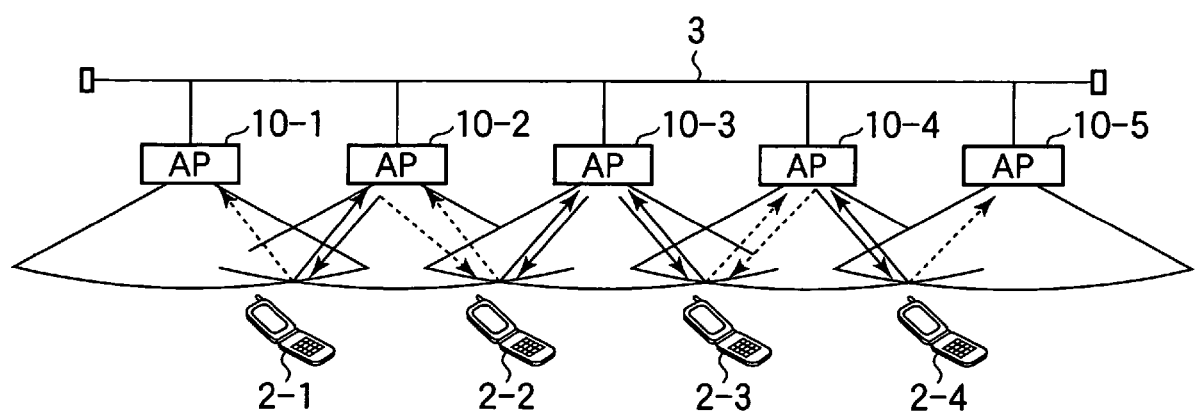
FIG. 1 illustrates a wireless network.

An embodiment of the invention will now be described with reference to the attached drawings, in which like elements are indicated by like reference characters. Throughout the description, solid arrows in the network drawings indicate wireless associations or communication, dotted arrows indicate wireless interference, and outlined arrows indicate information exchanged between access points.

Referring again to FIG. 1, the wireless network 1 in the embodiment comprises the same five access points 10-1 to 10-5 and four wireless terminals 2-1 to 2-4 as in the preceding discussion of the prior art. When it is not necessary to distinguish individual access points and wireless terminals, they will be referred to generically as access points 10 and wireless terminals 2.

As in the prior art, the access points 10 are interconnected by a wired backbone network 3, and all access points 10 use the same wireless channel for communication with wireless terminals 2.

Access points 10-1 to 10-5 transmit respective control signals (e.g., beacon signals) at given intervals to initiate communication or exchange information with the wireless terminals 2. The wireless terminals 2 select the access points 10 with which to associate and transmit signals requesting association. Access points 10-1 to 10-5 receive these incoming signals, thereby determine which wireless terminals 2 to associate with, and store information indicating the associated wireless terminals 2, as well as indicating non-associated wireless terminals 2 that are within communication range.

Access points 10-1 to 10-5 also exchange control information about wireless terminals 2-1 to 2-4 with each other through the backbone network 3 and, when given conditions are satisfied, may transfer the association of a wireless terminal 2 from one access point to another, a process referred to below as 'hand-over'.

Figure 2:
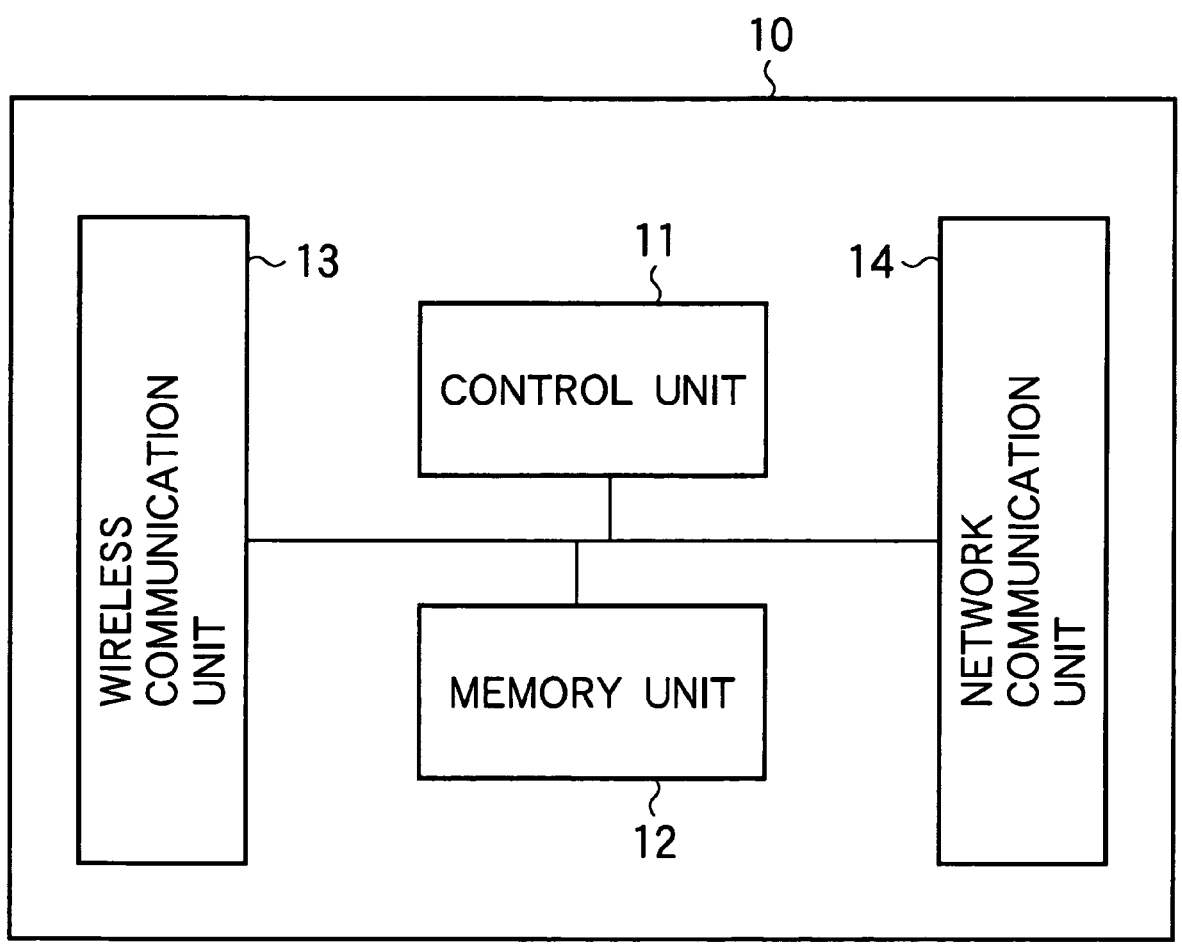
FIG. 2 is a block diagram showing the internal structure of an access point in an embodiment of the invention.

Referring to FIG. 2, the hardware structure of each access point 10 includes at least a control unit 11, a memory unit 12, a wireless communication unit 13, and a network communication unit 14.

The control unit 11, which may be a microprocessor or some other type of central processing unit (CPU), controls the access point 10. The memory unit 12 may include, for example, non-volatile read-only memory (ROM), volatile readable and writable random-access memory (RAM), and non-volatile rewritable memory such as electrically erasable and programmable read-only memory (EEPROM). The CPU executes, for example, a processing program stored in ROM by using fixed data stored in ROM, parameter data stored in EEPROM, and temporary data stored in RAM, using RAM as a working memory to implement the functions of the access point 10.

The wireless communication unit 13 is connected to an antenna (not shown) and is controlled by the control unit 11 to establish wireless communication with wireless terminals 2 that are within signal range of the access point 10, using a predetermined channel and communication method. The wireless communication unit 13 also receives incoming wireless signals and sends the information included in the signals to the control unit 11.

The network communication unit 14 is connected to the backbone network 3 (not shown) and communicates with the other access points 10 under control of the control unit 11.

Figure 3:
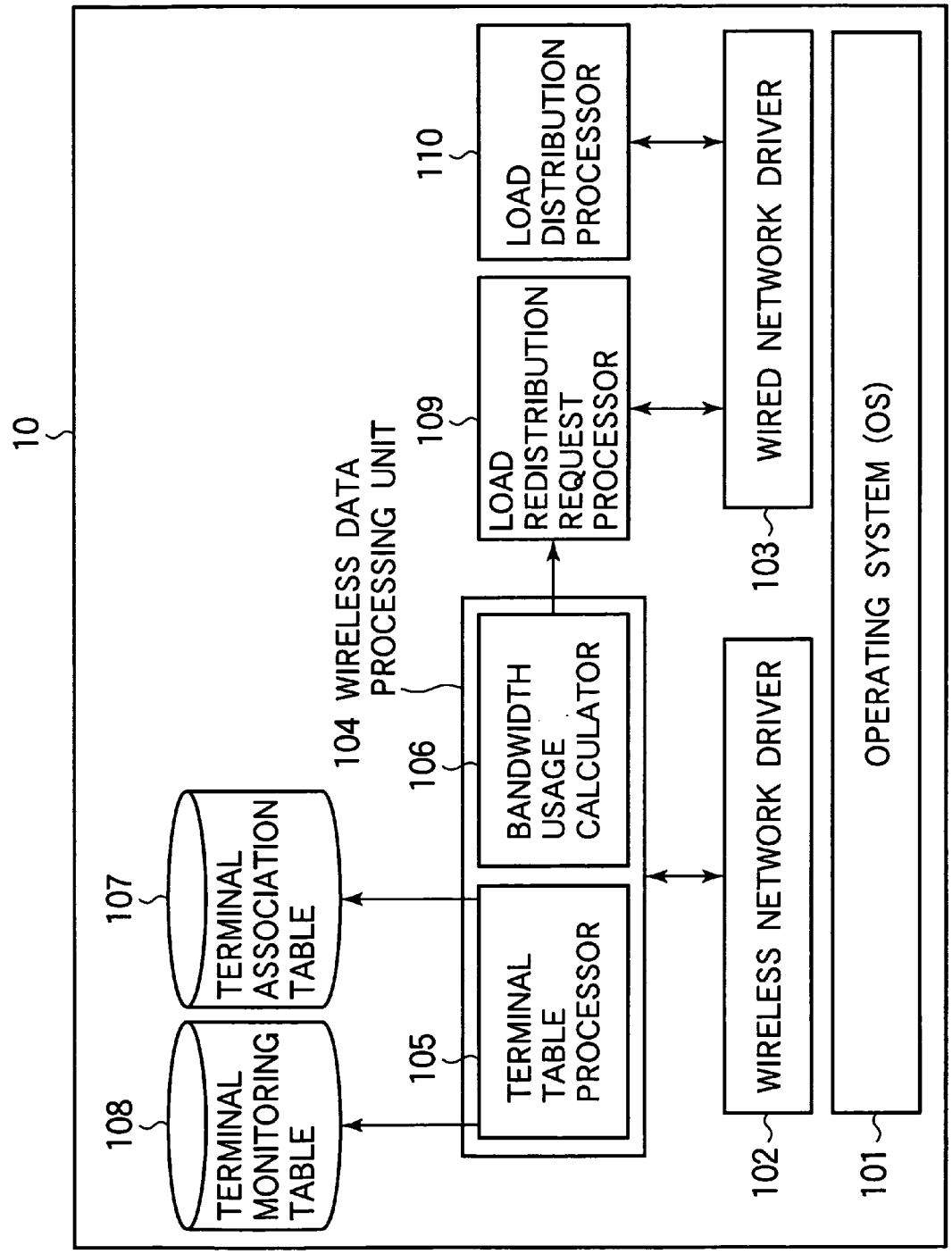
FIG. 3 is a block diagram showing the internal functions of an access point in the embodiment.

Referring to FIG. 3, the software structure of each access points 10 comprises at least an operating system (OS) 101, a wireless network driver 102, a wired network driver 103, a wireless data processing unit 104, a terminal association table 107, a terminal monitoring table 108, a load redistribution request processor 109, and a load redistribution processor 110. The wireless data processing unit 104 further includes a terminal table processor 105 and a bandwidth usage calculator 106.

The operating system 101 controls the software programs or tasks that perform the functions of the access point 10.

The wireless network driver 102 uses the destination and source address information included in the header of a received signal to determine whether the signal was transmitted from an associated wireless terminal 2 and was thus intended to be received, or was transmitted by a wireless terminal 2 associated with another access point, and sends the wireless data processing unit 104 information identifying the wireless terminal 2 that transmitted the signal, together with information indicating whether this wireless terminal is associated or not. The wireless network driver 102 also receives transmit data from the wireless data processing unit 104 and generates an outgoing wireless signal with a prescribed frame structure.

In the wireless data processing unit 104, the terminal table processor 105 uses the information received from the wireless network driver 102 to maintain a list of addresses of wireless terminals 2 associated with the access point 10. This list of addresses is stored in the terminal association table 107.

From header data (source and destination addresses) of signals received by the wireless network driver 102 but not addressed to the access point 10, the terminal table processor 105 learns the presence of wireless terminals 2, located in the overlapping borders of its signal range, that are associated with adjacent access points, and maintains a list of addresses of these wireless terminals 2. This list of addresses is stored in the terminal monitoring table 108.

From the information supplied by the wireless network driver 102, the bandwidth usage calculator 106 calculates the amount of network bandwidth being used. If the amount exceeds a predetermined threshold value, the bandwidth usage calculator 106 sends a load redistribution request to the load redistribution request processor 109.

Upon reception of the load redistribution request from the bandwidth usage calculator 106, the load redistribution request processor 109 transmits the request to the other access points 10 through the backbone network 3.

Upon reception of a load redistribution request from one of the other access points 10 through the backbone network 3, the load redistribution processor 110 carries out a hand-over process that, if successful, hands an associated wireless terminal 2 over to an access point not adjacent to the access point that initiated the load redistribution request. The hand-over has the effect of reducing interference and increasing network availability, as explained below.

The backbone network 3 provides a communication channel for exchanging information among the access points 10. The backbone network 3 may be either a public switched network or a dedicated network, and may have, for example, a mesh, bus, ring, or star topology. Any communication protocol that permits communication among the access points 10 may be used on the backbone network 3. For example, the well-known Transmission Control Protocol/Internet Protocol (TCP/IP) may be used. The backbone network 3 shown in the drawings is a wired network, but the backbone network 3 may be partly or entirely wireless if that permits communication among access points 10-1 to 10-5.

The wireless terminals 2 may be personal computers, mobile phones (as shown), personal digital assistants (PDAs) or other types of mobile information communication terminals. Mobile phones may use any of the many known mobile telephone systems, including the mobile IP phone system and the Japanese Personal Handy System (PHS).

Next, the load redistribution procedures followed by the access points 10 constituting the wireless network 1 of this embodiment will be described with reference to FIGS. 4 to 17. In the following description, the load redistribution process is initiated by access point 10-3.

Access point 10-3 transmits a control signal (e.g., a beacon signal) at given intervals to establish wireless communication with wireless terminals 2 located within its signal range. In the initial state illustrated in FIG. 4, wireless terminals 2-2 and 2-3 have associated with access point 10-3 and access point 10-3 is communicating with both of these terminals.

Figure 5:
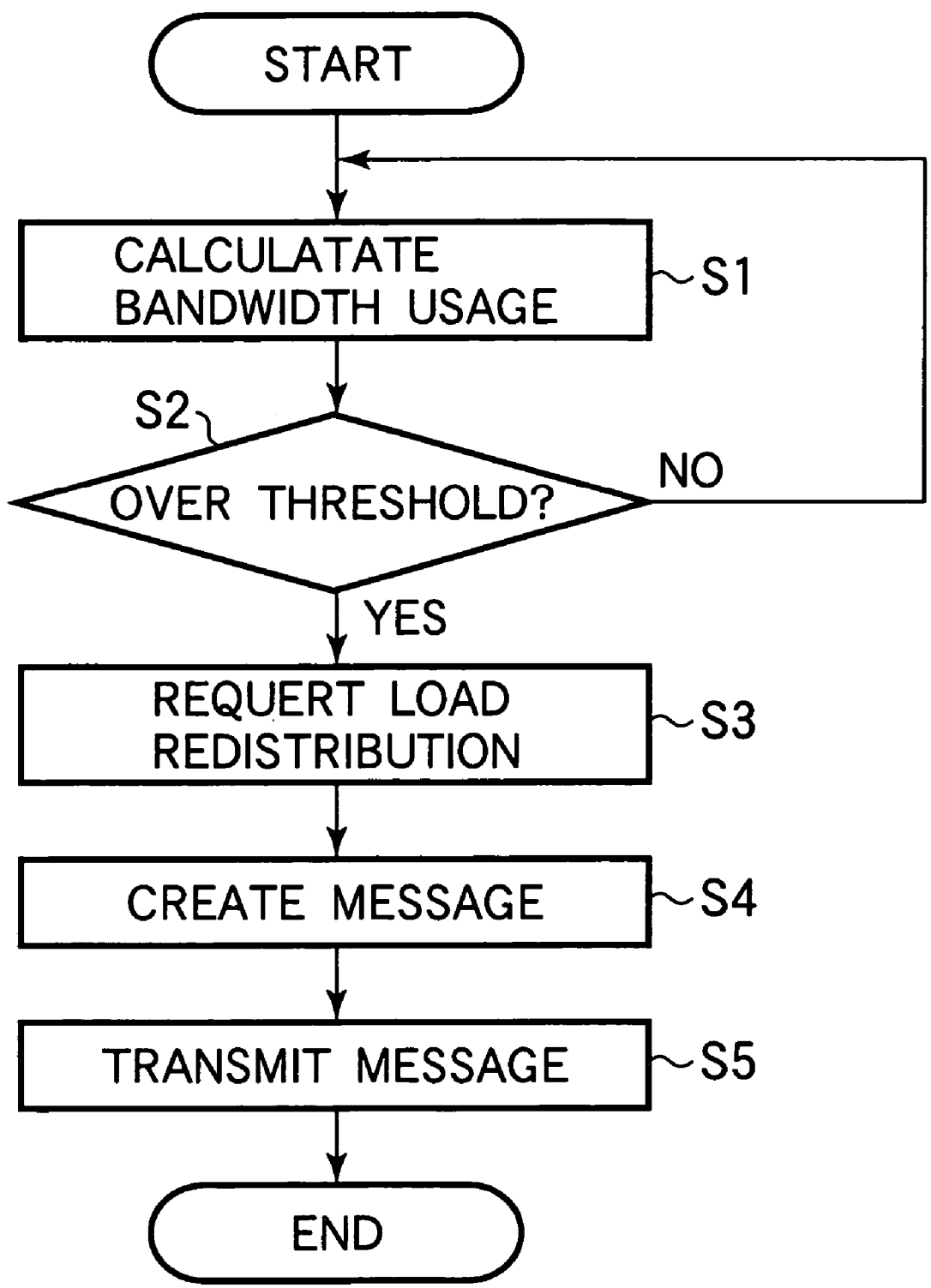
FIG. 5 is a flowchart indicating associated operations at the first access point.

Referring now to FIG. 5, in step S1, the bandwidth usage calculator 106 at access point 10-3 calculates the amount of network bandwidth being used in its vicinity, that is, the amount of data being transmitted and received by its wireless network driver 102. The calculated value is compared with a predetermined threshold value in step S2; if the calculated value exceeds the threshold value, the bandwidth usage calculator 106 notifies the load redistribution request processor 109 in step S3. The bandwidth usage calculator 106 also sends the load redistribution request processor 109 the address of an associated wireless terminal 2 that is communicating with access point 10-3, obtained by taking any one of the wireless terminal addresses in the terminal association table 107. In the following description, it will be assumed that the address of wireless terminal 2-2 is taken.

Figure 4:
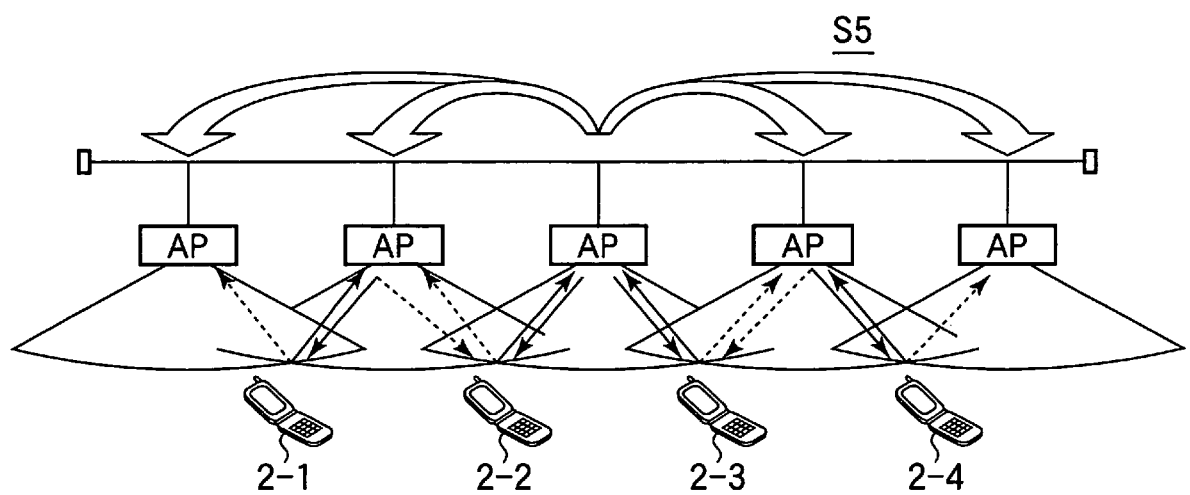
FIG. 4 schematically illustrates a step in the load redistribution process in the embodiment.

Upon receiving the load redistribution processing request, the load redistribution request processor 109 transfers the request and the address of the associated wireless terminal 2-2 to the wired network driver 103. The wired network driver 103 generates a load distribution processing request message, including the address of wireless terminal 2-2, in step S4, and transmits it as a broadcast message through the backbone network 3 in step S5, as illustrated in FIG. 4.

Figure 6:
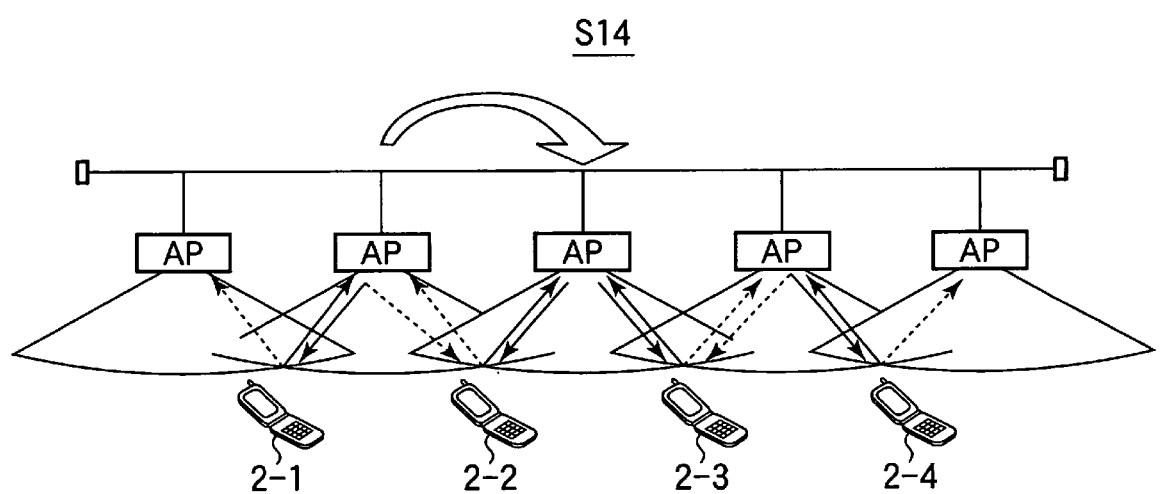
FIG. 6 schematically illustrates another step in the load redistribution process in the embodiment.
Figure 7:
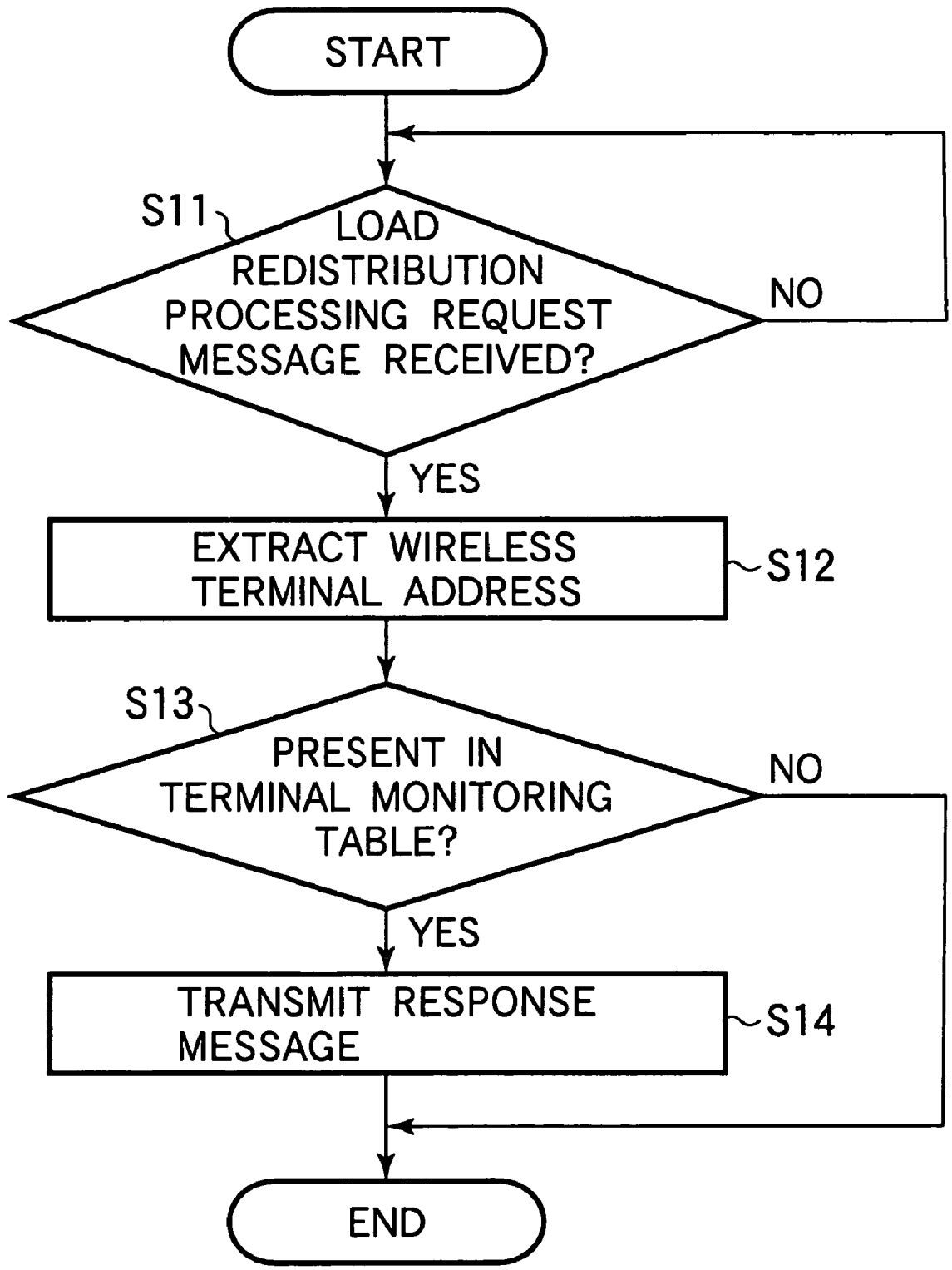
FIG. 7 is a flowchart indicating associated operations at the second access point.

This broadcast message elicits a response as shown in FIGS. 6 and 7. When an access point 10 other than access point 10-3 receives the load redistribution processing request message in step S11 in FIG. 7, the wired network driver 103 in the receiving access point extracts the address of the wireless terminal 2 contained in the load redistribution processing request message in step S12 and sends it to the load redistribution request processor 109.

In step S13 the load redistribution request processor 109 checks whether or not the received wireless terminal address is stored in the terminal monitoring table 108; if the wireless terminal address is found in the terminal monitoring table 108, the wired network driver 103 transmits a response message to access point 10-3 requesting load redistribution processing in step S14.

In the present example, the address of wireless terminal 2-2 is stored in the terminal monitoring table 108 only at access point 10-2, so access point 10-2 returns the response message to access point 10-3, as illustrated in FIG. 6.

Figure 8:
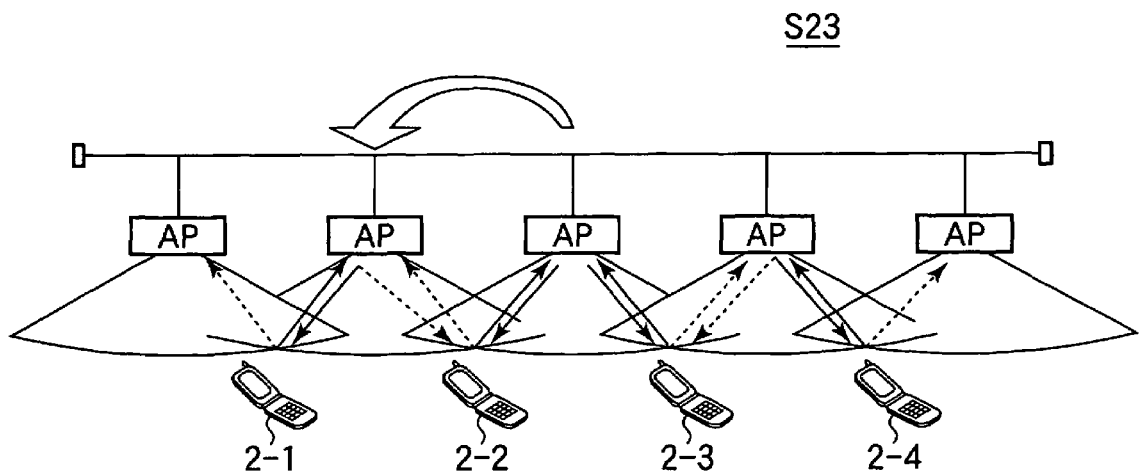
FIG. 8 schematically illustrates another step in the load redistribution process in the embodiment.
Figure 9:
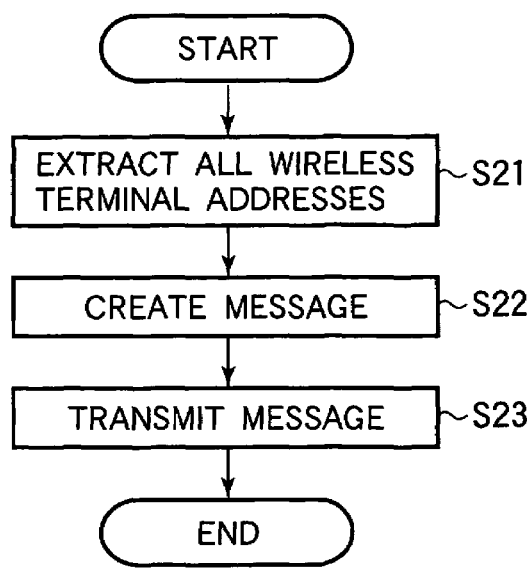
FIG. 9 is a flowchart indicating associated operations at the first access point.

The access point that initiated the load redistribution request now proceeds as shown in FIGS. 8 and 9. In the present example, when access point 10-3 receives the response message returned from access point 10-2, its load redistribution request processor 109 extracts the addresses of all the wireless terminals 2 registered in its terminal association table 107 in step S21 in FIG. 9.

The load redistribution request processor 109 generates a message in step S22 including the extracted wireless terminal addresses and requesting hand-over of a wireless terminal 2 other than the wireless terminals 2 having those addresses, and transmits the generated message to access point 10-2 in step S23, as shown in FIG. 8.

In the present example, the addresses of wireless terminals 2-2 and 2-3 are registered in the terminal association table 107 at access point 10-3, so these addresses are extracted and access point 10-2 is requested to hand over control of a terminal other than wireless terminals 2-2 and 2-3.

Figure 10:
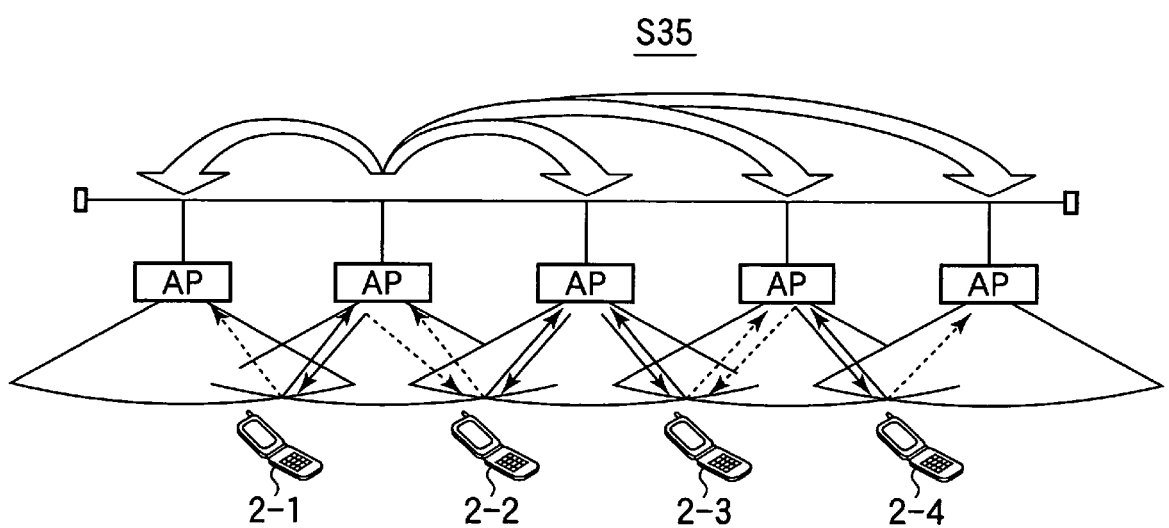
FIG. 10 schematically illustrates another step in the load redistribution process in the embodiment.
Figure 11:
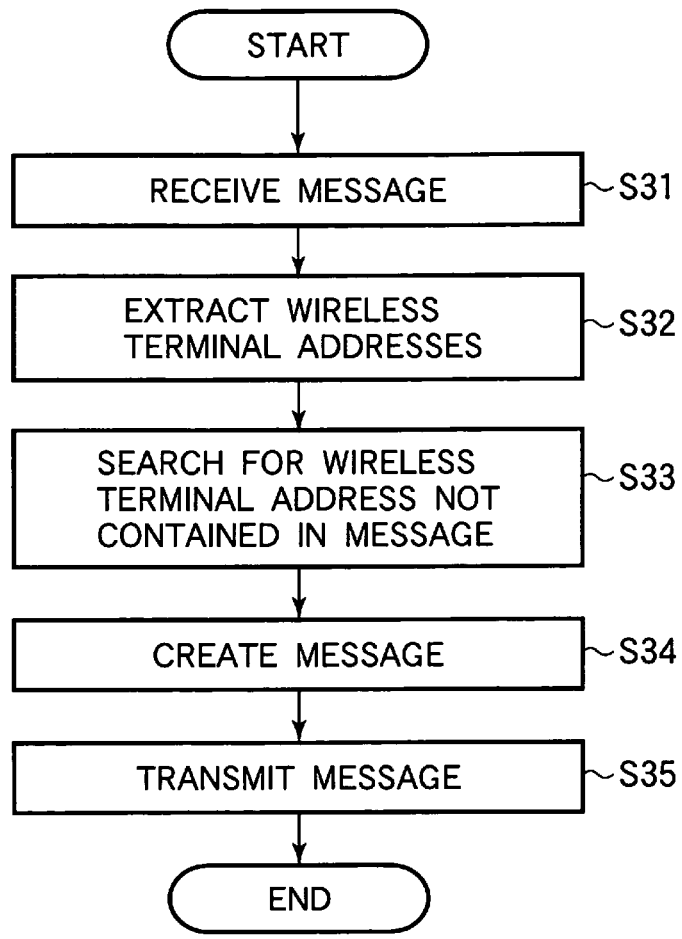
FIG. 11 is a flowchart indicating associated operations at the second access point.

Access point 10-2 proceeds as shown in FIGS. 10 and 11. Its wireless communication unit 13 receives the hand-over processing request message in step S31 in FIG. 11. Its load redistribution request processor 109 extracts the addresses of the wireless terminals 2 associated with access point 10-3 from the message in step S32, and searches its terminal association table 107 for the addresses of other wireless terminals, not contained in the message, in step S33.

If any such wireless terminal address is found in step S33, then in step S34 the load redistribution request processor 109 creates a message inquiring whether any other access point is receiving a signal from the wireless terminal 2 with that address and can accept a hand-over of the terminal, and transmits the message to the other access points 10 in step S35, as illustrated in FIG. 10.

In the present example, access point 10-2 extracts the addresses of wireless terminals 2-2 and 2-3 from the message broadcast in FIG. 8, finds the address of a different wireless terminal 2-1 in its terminal association table 107, selects it as a candidate for hand-over processing, and sends the other access points 10 a message inquiring whether they are receiving signals from wireless terminal 2-1 and can accept a hand-over. This message may be broadcast through the backbone network 3 as shown in FIG. 10.

Figure 12:
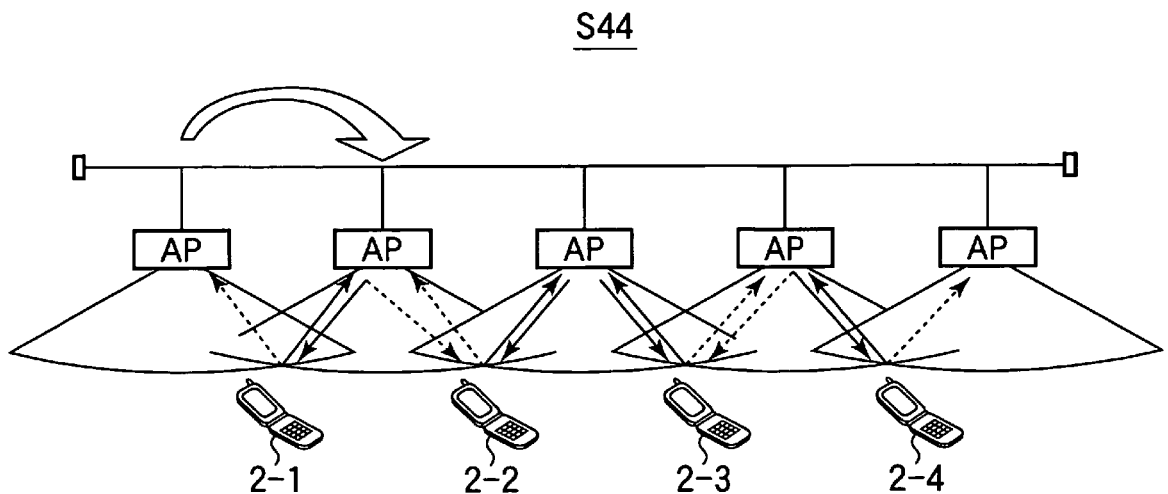
FIG. 12 schematically illustrates another step in the load redistribution process in the embodiment.
Figure 13:
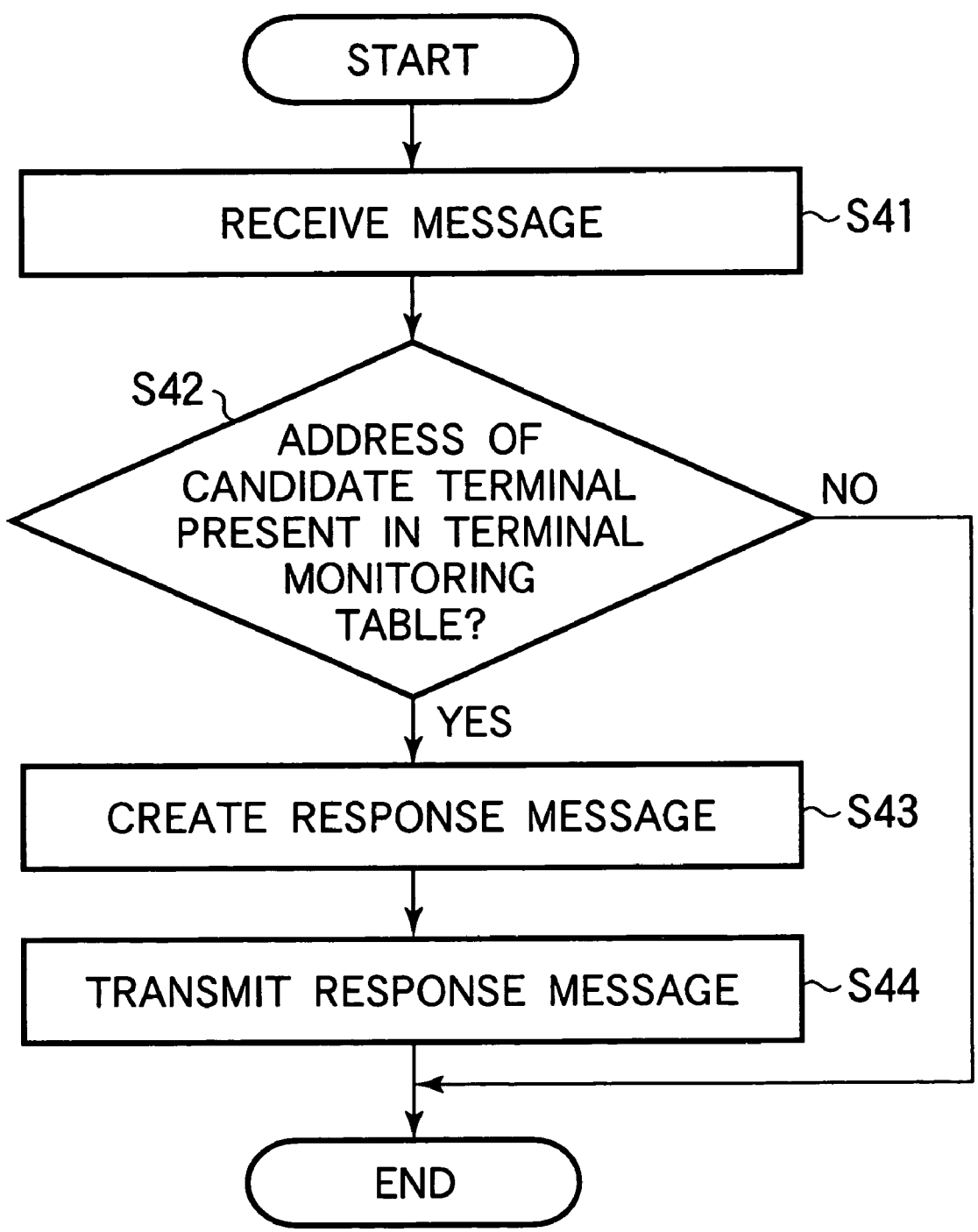
FIG. 13 is a flowchart indicating associated operations at the third access point.

The response to this message is produced as illustrated in FIGS. 12 and 13.

When each access point other than access point 10-2 receives the inquiring message transmitted by access point 10-2 in step S41 in FIG. 13, it extracts the address of the candidate hand-over wireless terminal 2 from the message. The load redistribution request processor 109 determines whether or not the address of the candidate hand-over wireless terminal 2 is recorded in the terminal monitoring table 108 in step S42. If the address is recorded and the hand-over is acceptable, the load redistribution request processor 109 generates a response message in step S43, indicating willingness to accept a hand-over of the wireless terminal 2. The response message is then sent to access point 10-2 in step S44.

In the present example, upon reception of the inquiring message from access point 10-2 at access point 10-1, the load redistribution request processor 109 at access point 10-1 looks for the address of wireless terminal 2-1 in its the terminal monitoring table 108, finds this address, and returns a response message to access point 10-2 as shown in FIG. 12, indicating that it can accept a hand-over of wireless terminal 2-1.

Figure 14:
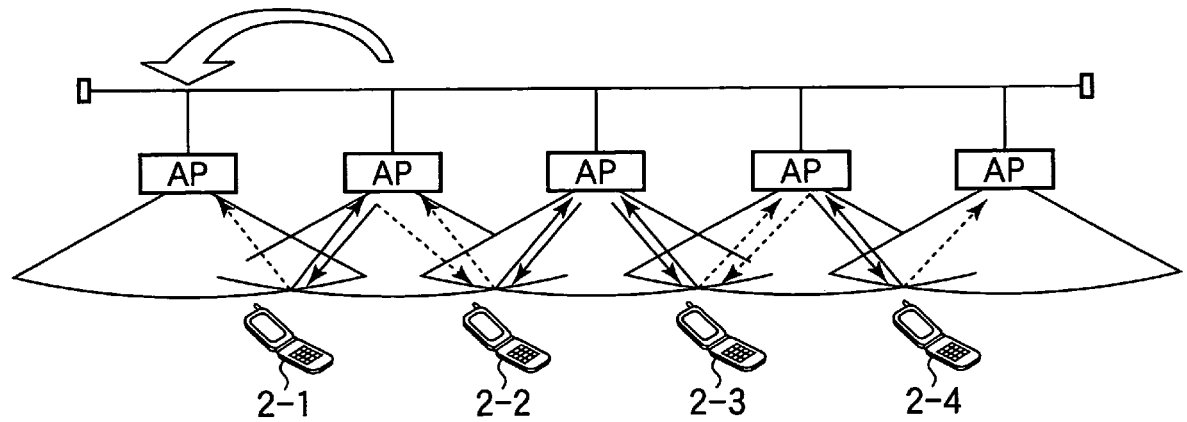
FIG. 14 schematically illustrates another step in the load redistribution process in the embodiment.
Figure 15:
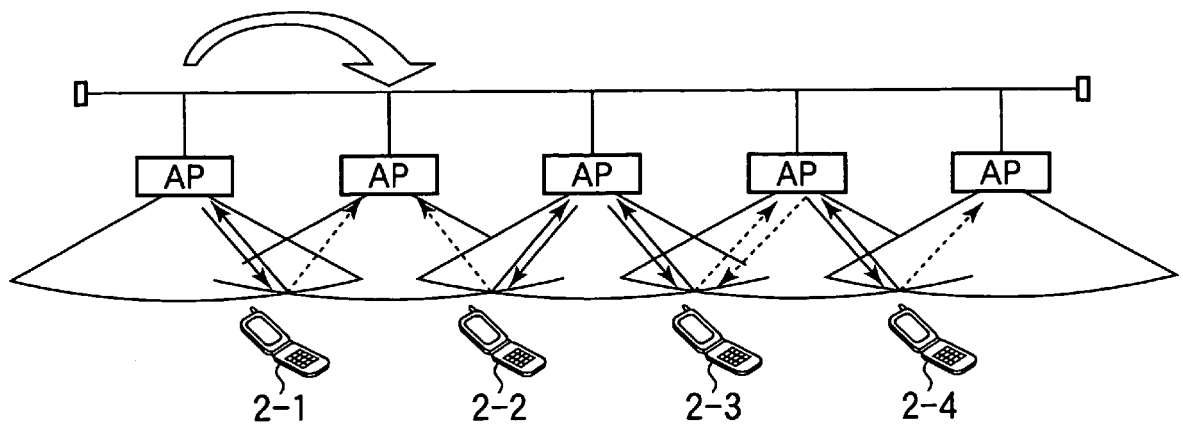
FIG. 15 schematically illustrates another step in the load redistribution process in the embodiment.

The hand-over is then effected as shown in FIGS. 14 and 15. The load redistribution request processor 109 at access point 10-2 asks the access point 10-1 that transmitted the response message to carry out hand-over processing for wireless terminal 2-1 in step S45, shown in FIG. 14. When the hand-over processing for wireless terminal 2-1 is completed, access point 10-1 transmits a hand-over completion message to access point 10-2 in step S46 in FIG. 15. Wireless terminal 2-1 is now associated with access point 10-1, so access point 10-2 stops transmitting signals to wireless terminal 2-1 and therefore stops interfering with the signals transmitted to wireless terminal 2-2 by access point 10-3. Wireless terminal 2-1 can now communicate with access point 10-1 and wireless terminal 2-2 can simultaneously communicate with access point 10-3 without mutual interference.

The hand-over of wireless terminal 2-1 may be carried out by various protocols, which specify the explicit information exchanged between access points 10-1 and 10-2. An exemplary protocol will be described with reference to FIG. 16.

Figure 16:
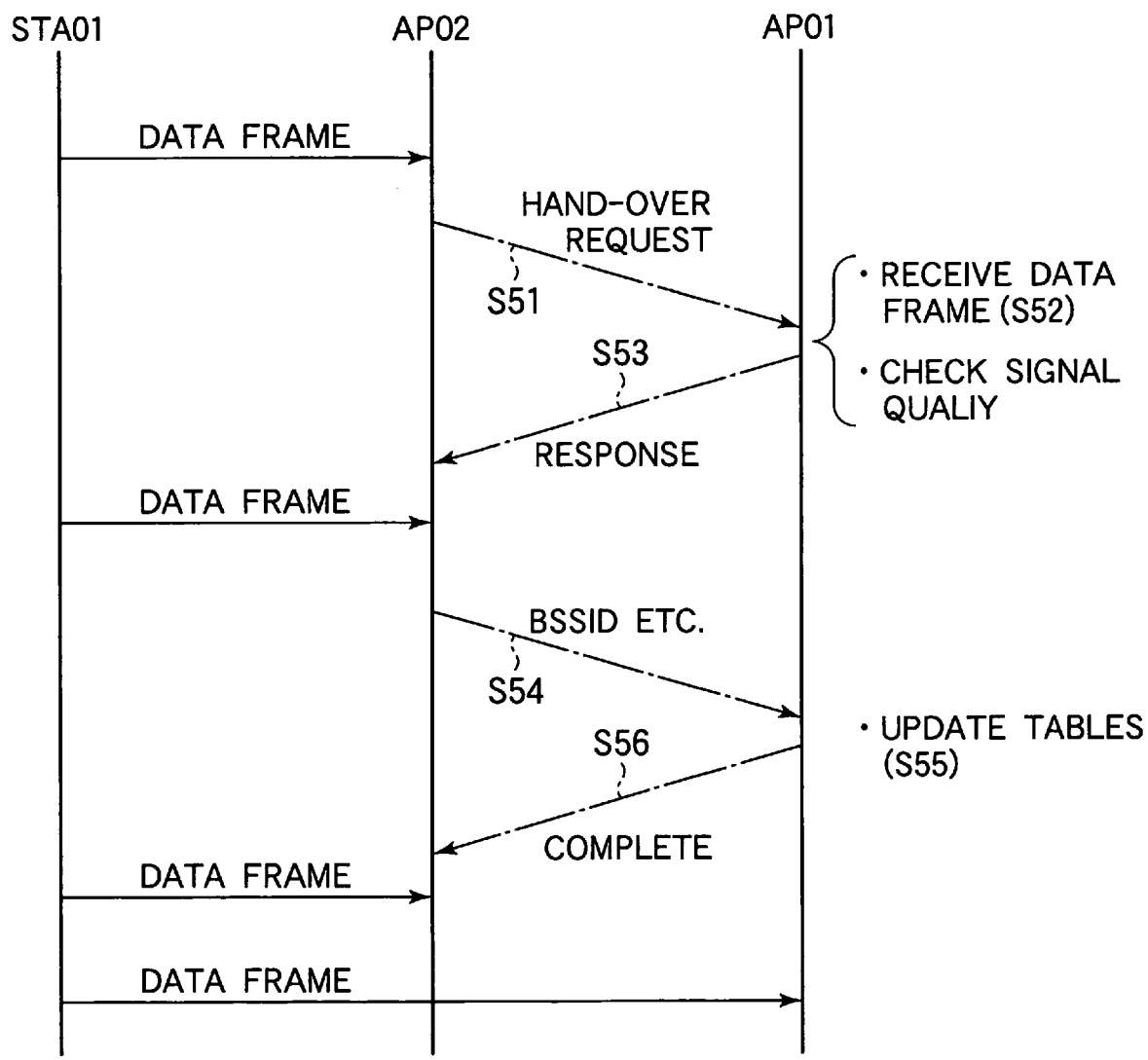
FIG. 16 illustrates a hand-over procedure.

At the beginning of the sequence illustrated in FIG. 16, access point 10-2 receives a data frame from wireless terminal 2-1. The data frame includes the basic services set identifier (BSSID) of wireless terminal 2-1; in this example, the BSSID of wireless terminal 2-1 is assumed to be 'A'. Since wireless terminal 2-1 is associated with access point 10-2, this BSSID (A) is recorded in the terminal association table 107 at access point 10-2. The signal sent from wireless terminal 2-1 to access point 10-2 is also picked up at access point 10-1, but since wireless terminal 2-1 is not associated with access point 10-1, the BSSID of wireless terminal 2-1 is recorded in the terminal monitoring table 108 of access point 10-1.

In step S51, access point 10-2 sends a hand-over request to access point 10-1, specifying the BSSID (A) of wireless terminal 2-1.

In step S52, access point 10-1 recognizes that the BSSID (A) of wireless terminal 2-1 is recorded in its terminal monitoring table 108 and decides whether or not it will be able to accept the hand-over. This decision may be based on the received signal strength of the data frame transmitted by wireless terminal 2-1 or other factors: for example, access point 10-2 may transfer received signal strength information to access point 10-1 when requesting the hand-over, and access point 10-1 may decide whether it can accept the hand-over request by comparing its own received signal strength with the received signal strength reported by access point 10-2. In the present example access point 10-1 determines that it can accept the hand-over request.

Access point 10-1 therefore notifies access point 10-2 of the acceptance of the hand-over request in step S53. The hand-over has not been completed yet, however, so it is still access point 10-2 that receives the next data frame transmitted from wireless terminal 2-1. More generally, during any phase of the hand-over procedure, the access point that has the BSSID (A) of wireless terminal 2-1 registered in its terminal association table 107 (or an equivalent BSSID management table) must receive any data frames transmitted by wireless terminal 10-1 and transmit any necessary data frames to wireless terminal 10-1.

After receiving the hand-over acceptance notification, if access point 10-2 selects access point 10-1 as the access point to which to hand over wireless terminal 2-1, in step S54 it sends access point 10-1 a hand-over request including the BSSID (A) of wireless terminal 2-1 and other relevant information, such as the interval at which a beacon signal needs to be transmitted from the access point to the wireless terminal. In step S55, access point 10-1 stores this information in its terminal association table 107. In step S56, access point 10-1 notifies access point 10-2 of completion of the hand-over.

When notified of completion of the hand-over, access point 10-2 deletes the information about wireless terminal 2-1 from its terminal association table 107, but retains the BSSID of wireless terminal 2-1 in its terminal monitoring table 108 for consistency, so that it will not assign the same identifier to another wireless terminal later. The identifier in this case refers to the combination of a service set identifier (SSID) and source address (SA). The reason is that although wireless terminal 2-1 is no longer part of the BSS network administered by access point 10-2, it is still part of the ESS network 1 as a whole.

If another data frame is received from wireless terminal 2-1 around this time, before access point 10-1 has had time to establish communication with wireless terminal 2-1, the data frame is still received by access point 10-2, as shown.

When the hand-over procedure has completely ended, access point 10-2 stops transmitting beacon frames to wireless terminal 2-1 and access point 10-1 begins transmitting such frames, based on the beacon frame information it has obtained from access point 10-2. The next data frame transmitted by wireless terminal 2-1 is accordingly received by access point 10-1, as shown.

Figure 17:
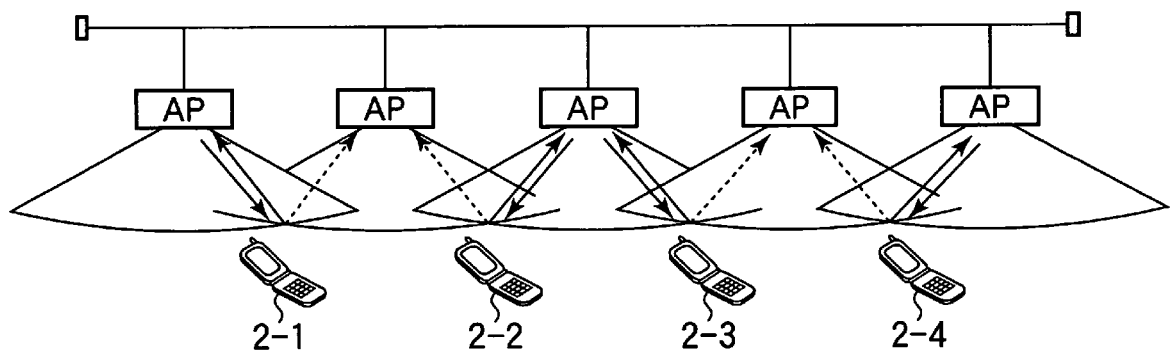
FIG. 17 schematically illustrates another step in the load redistribution process in the embodiment.

Following the hand-over of wireless terminal 2-1 described above, a similar procedure may be followed to hand wireless terminal 2-4 over from access point 10-4 to access point 10-5, resulting in the pattern of network associations shown in FIG. 17. In this pattern no interference occurs at any access point 10 or wireless terminal 2.

As described above, this embodiment can reduce interference by allowing an access point to request the hand-over of wireless terminals from adjacent access points with overlapping signal ranges to more distant access points with non-overlapping signal ranges. By permitting an access point to initiate a hand-over on the basis of bandwidth usage, rather than waiting for some wireless terminal to initiate a hand-over on the basis of reception conditions, the present embodiment enables a wireless network to take prompt action to redistribute its associations and reduce interference under conditions of heavy bandwidth usage.

In the embodiment described above, each access point 10 has a terminal table processor 105, bandwidth usage calculator 106, terminal association table 107, terminal monitoring table 108, load redistribution request processor 109, and load redistribution processor 110, but some or all of these components may be centralized at a single access point or other facility connected to the backbone network 3.

The BSSIDs described as being stored in the terminal association table 107 and terminal monitoring table 108 may be stored in other tables.

Those skilled in the art will recognize that further variations are possible within the scope of the invention, which is defined in the appended claims.

What is claimed is:

1. A method of distributing loads among a plurality of access points providing wireless access from a plurality of terminals to a network wherein
   each terminal selectively associates with an access point with which the terminal is in a position to communicate,
   the plurality of access points include a first access point, a second access point, and a third access point;
   the wireless communication range of the first access point and the wireless communication range of the second access point partially overlap each other; and
   the wireless communication range of the second access point and the wireless communication range of the third access point partially overlap each other;
   the method comprising:
   maintaining, at each of the first access point, the second access point and the third access point, information about positions and associations of the terminals according to signals received from the terminals at the first, second and third access points;
   calculating, at the first access point, a load on the first access point;
   selecting, at the first access point, from among the terminals, when the calculated load satisfies a predetermined condition, a first terminal associated with and communicating with the first access point;
   finding, among the access points, the second access point with which the first terminal is in position to communicate;
   transmitting a first request from the first access point to the second access point, requesting a hand-over of a second terminal which is different from the first terminal, which is associated with the second access point, and which is in a position to communicate with the first access point, to the third access point;
   finding, at the second access point, responsive to the first request, the second terminal;
   finding the third access point with which the second terminal is in a position to communicate;
   transmitting a first command from the second access point to the third access point, commanding the third access point to accept a hand-over of the second terminal from the second access point;
   effecting, at the third access point, responsive to the first command, a hand-over of the second terminal;
   associating the second terminal with the third access point;
   transmitting a message from the third access point to the second access point, notifying that the hand-over of the second terminal has been completed;
   receiving, at the second access point, the message from the third access point, that the hand-over of the second terminal has been completed; and
   de-associating the second terminal from the second access point.

2. The method of claim 1, wherein the finding of the second access point includes broadcasting a request, identifying the first terminal, from the first access point to the access points other than the first access point in the network.

3. The method of claim 1, wherein the finding of the second terminal includes:
   sending information from the first access point to the second access point identifying all of the terminals associated with the first access point; and
   searching, at the second access point, for a terminal associated with the second access point but not with the first access point.

4. The method of claim 1, wherein the finding of the third access point includes broadcasting a request, identifying the second terminal, from the second access point to the access points other than the second access point in the network.

5. The method of claim 1, wherein
   the plurality of access points further include a fourth access point, and a fifth access point;
   the wireless communication range of the first access point and the wireless communication range of the fourth access point partially overlap each other; and
   the wireless communication range of the fourth access point and the wireless communication range of the fifth access point partially overlap each other;
   the method further comprising:
   maintaining, at each of the fourth access point and the fifth access point, information about positions and associations of the terminals according to signals received from the terminals at the fourth and fifth access points;
   finding, among the access points, the fourth access point with which the first terminal is in position to communicate;
   transmitting a second request from the first access point to the fourth access point, requesting a hand-over of a third terminal which is different from the first terminal, which is associated with the fourth access point, and which is in a position to communicate with the first access point, to the fifth access point;
   finding, at the fourth access point, responsive to the second request, the third terminal;
   finding, among the access points, the fifth access point with which the third terminal is in a position to communicate;
   transmitting a second command from the fourth access point to the fifth access point, commanding the fifth access point to accept a hand-over of the third terminal from the fourth access point;
   effecting, at the fifth access point, responsive to the second command, a hand-over of the third terminal;
   associating the third terminal with the fifth access point;
   transmitting a message from the fifth access point to the fourth access point, notifying that the hand-over of the third terminal has been completed;
   receiving, at the fourth access point, the message from the fifth access point, that the hand-over of the third terminal has been completed; and
   de-associating the third terminal from the fourth access point.

6. A load distribution system for distributing loads among a plurality of access points providing wireless access from a plurality of terminals to a network wherein each terminal selectively associates with an access point with which the terminal is in a position to communicate, the plurality of access points include a first access point, a second access point, and a third access point;

the wireless communication range of the first access point and the wireless communication range of the second access point partially overlap each other; and the wireless communication range of the second access point and the wireless communication range of the third access point partially overlap each other;

each of the first, second and third access points includes a first processing means for maintaining information about positions and associations of the terminals according to signals received from the terminals at the first, second and third access points;

the first access point includes a second processing means for calculating a load on the first access point; and a third processing means for selecting, from among the terminals, when the calculated load satisfies a predetermined condition, a first terminal associated with and communicating with the first access point;

finding, among the access points, a second access point with which the first terminal is in position to communicate; and transmitting a first request to the second access point, requesting a hand-over of a second terminal which is different from the first terminal, which is associated with the second access point, and which is in a position to communicate with the first access point, to the third access point;

the second access point includes a fourth processing means for finding, responsive to the first request, the second terminal;

finding the third access point with which the second terminal is in a position to communicate; and transmitting a first command to the third access point, commanding the third access point to accept a hand-over of the second terminal from the second access point;

the third access point includes a fifth processing means for effecting, responsive to the first command, a hand-over of the second terminal;

associating the second terminal with the third access point; and transmitting a message from the third access point to the second access point, notifying that the hand-over of the second terminal has been completed;

the second access point further includes a sixth processing means for receiving, the message from the third access point, that the hand-over of the second terminal has been completed; and de-associating the second terminal from the second access point.

7. The load distribution system of claim 6, wherein the plurality of access points include a fourth access point, and a fifth access point;

the wireless communication range of the first access point and the wireless communication range of the fourth access point partially overlap each other; and the wireless communication range of the fourth access point and the wireless communication range of the fifth access point partially overlap each other;

each of the fourth and fifth access points includes a seventh processing means for maintaining information about positions and associations of the terminals according to signals received from the terminals at the fourth and fifth access points;

the third processing means of the first access point also finds, among the access points, a third access point with which the first terminal is in position to communicate; and transmits a second request to the fourth access point, requesting a hand-over of a third terminal which is different from the first terminal, which is associated with the fourth access point, and which is in a position to communicate with the first access point, to the fifth access point;

the fourth access point includes a ninth processing means for finding, responsive to the second request, the third terminal;

finding the fifth access point with which the third terminal is in a position to communicate; and transmitting a second command to the fifth access point, commanding the fifth access point to accept a hand-over of the third terminal from the fourth access point;

the fifth access point includes a tenth processing means for effecting, responsive to the second command, a hand-over of the third terminal;

associating the third terminal with the fifth access point; and transmitting a message to the fourth access point, notifying that the hand-over of the third terminal has been completed;

the fourth access point further includes an eleventh processing means for receiving, the message from the fifth access point, that the hand-over of the third terminal has been completed; and de-associating the third terminal from the fourth access point.

* * * * *